H. P. HOOD.
SHOCK ABSORBER.
APPLICATION FILED JAN. 18, 1916.
1,203,001.
Patented Oct. 31, 1916.
2 SHEETS—SHEET 1.
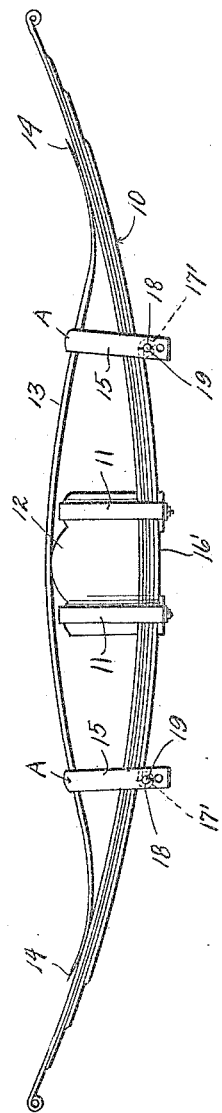
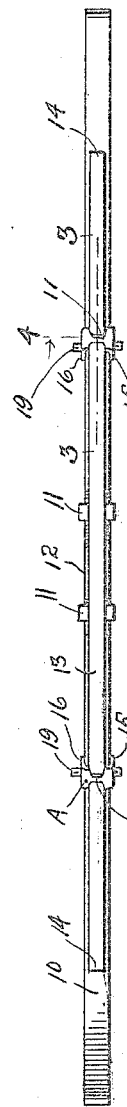
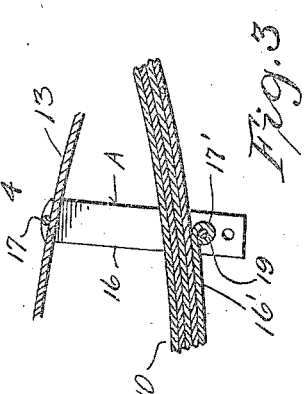
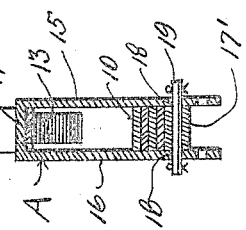
Inventor
H. P. Hood H. P. HOOD.
SHOCK ABSORBER.
APPLICATION FILED JAN. 18, 1916.
1,203,001.
Patented Oct. 31, 1916.
2 SHEETS—SHEET 2.
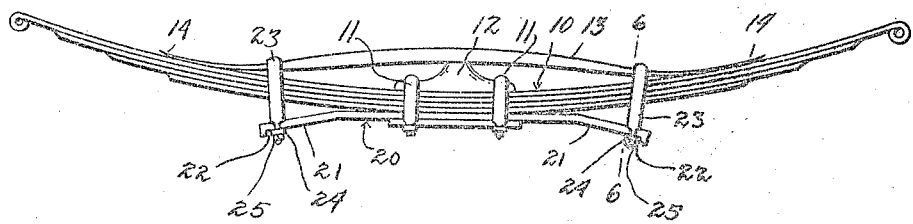
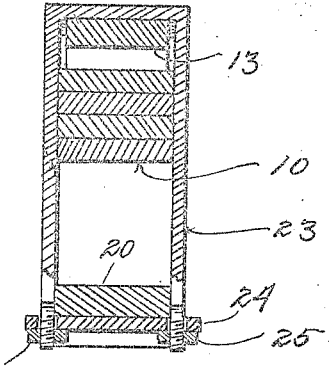
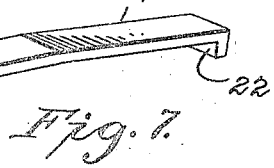
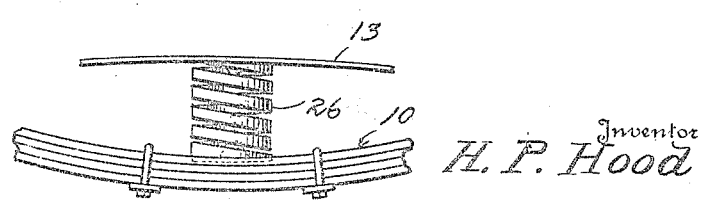

UNITED STATES PATENT OFFICE.

HOUSTON P. HOOD, OF BISHOP, CALIFORNIA.

SHOCK-ABSORBER.

1,203,001.

Specification of Letters Patent.

Patented Oct. 31, 1916.

Application filed January 18, 1916. Serial No. 72,785.

*To all whom it may concern:*

Be it known that I, HOUSTON P. HOOD, a citizen of the United States, residing at Bishop, in the county of Inyo, State of California, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers.

The object of the invention is to provide a shock absorber which will efficiently absorb the shock and jars incident to the travel of a vehicle and which embodies an improved construction whereby the device can be readily associated with an ordinary vehicle spring and the tension of which can be readily adjusted to meet varying conditions.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation of a vehicle spring having the improved shock absorber associated therewith; Fig. 2, a plan view of what is shown in Fig. 1; Fig. 3, a section on the line 3—3 of Fig. 2; Fig. 4, a section on the line 4—4 of Fig. 2; Fig. 5, a view in elevation showing a modified form of the invention; Fig. 6, a section on the line 6—6 of Fig. 5; Fig. 7, a perspective view of the tension plate removed, and Fig. 8, a view in elevation of still another modified form of the invention.

Referring to the drawings 10 indicates a vehicle spring of the usual construction and secured centrally upon the top of said spring through the medium of clamps 11 is a block 12 which is constructed in this instance of rigid material such as wood. The shock absorber proper comprises a leaf spring 13 the central portion of which bears upon the top of the block 12. The spring 13 tapers toward its outer ends to a knife edge 14, said outer ends of the spring having a wiping engagement with the top of the spring 10. Engaged around the springs 10 and 13 between the block 12 and respective ends of the spring 13 are tensioning clamps A, each of which comprises arms 15 and 16 and an arm connecting portion 17. The arm connecting portion of each clamp A is round so that a relatively small amount of friction between same and the spring 13 will be present. Secured to the underside of the spring 10 through the medium of the clamps 11 is a plate 16' provided at each end with an eye 17'. These eyes 17' register respectively with alined openings 18 in the arms 15 and 16 of the clamps A and engaged through the openings 18 of each clamp and respective eyes 17' is a securing pin 19. It will be noted that there is provided a plurality of alined openings in the arms 15 and 16 whereby the clamps A may be adjusted to vary the tension of the spring 13.

In the modified form of the invention shown in Figs. 5, 6 and 7 the plate 16' is dispensed with and a tension bar 20 secured against the under side of the spring 10 through the medium of the clamps 11. The outer end portions of the bar 20 are inclined away from the spring 10 as at 21 and the free ends of these inclined portions are shouldered as at 22. Clamps 23 embrace the springs 10 and 13 and the bar 20. These clamps are U-shaped and have slidable on their arms plates 24. Threaded on the arms of the clamps 23 are nuts 25 through the manipulation of which the plates 24 are forced against the bar 20 and the tension of the spring 13 varied.

In the modified form of the invention shown in Fig. 8 a rigid block for supporting the center of the springs 13 is dispensed with and a spring 26 substituted therefor.

What is claimed is:—

1. In a shock absorber, the combination with a vehicle spring, a supporting member secured to the central portion of the upper side of said spring, a leaf spring having its center supported by said member, the ends of said leaf springs departing to a knife edge and engaging the vehicle spring, and adjustable clips surrounding the vehicle spring and leaf spring inwardly of the points of engagement of the leaf spring with the vehicle spring and operating to vary the tension of the leaf spring.

2. In a shock absorber, the combination with a vehicle spring, a supporting member secured to the central portion of the upper side of said spring, a tension bar secured to the central portion of the lower side of said spring, the ends of said tension bar being inclined away from the vehicle spring, a leaf spring having its center supported by said member and its ends in engagement with the vehicle spring, and adjustable clips surrounding the vehicle spring, leaf springs, and tension bar and operating to vary the tension of the leaf spring.

In testimony whereof, I affix my signature, in the presence of two witnesses.

HOUSTON P. HOOD.

Witnesses:
 WALTER UTTER,
 TOM C. THORNTON.